April 22, 1947.  A. BOUWERS  2,419,478
APPARATUS FOR INDIRECT X-RAY PHOTOGRAPHY
Filed Jan. 18, 1943
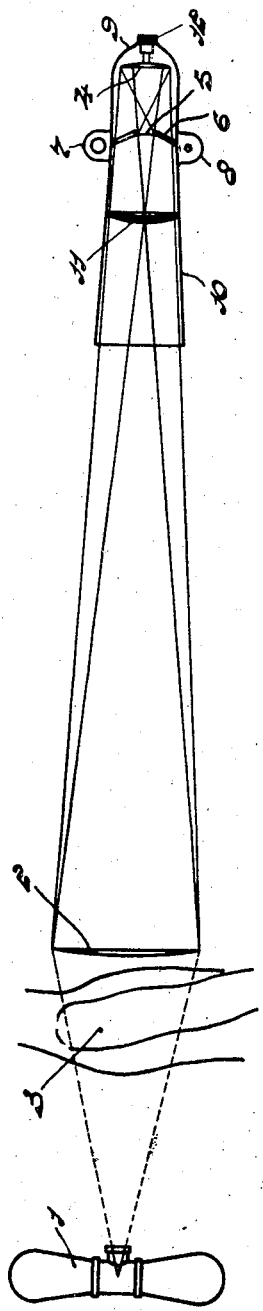
INVENTOR
ALBERT BOUWERS
BY
ATTORNEY.

Patented Apr. 22, 1947

2,419,478

UNITED STATES PATENT OFFICE 2,419,478

APPARATUS FOR INDIRECT X-RAY PHOTOGRAPHY

Albert Bouwers, Eindhoven, Netherlands, assignor to Hartford National Bank and Trust Company, Hartford, Conn., as trustee Application January 18, 1943, Serial No. 472,785
In the Netherlands October 24, 1940

5 Claims. (Cl. 250—65)

For taking X-ray photographs principally two different methods are followed. One method is that of the direct X-ray photography and consists in that the shadow image produced by the X-rays is made to fall on a photographic film which, as a rule, in order to increase the effect, is provided between fluorescent screens so that blackening of the film is obtained not only by the direct action of the X-rays but also by the action of the fluorescent light.

Although in this manner, thanks to the improvement in the X-ray tubes, the intensifying screens and the photographic films, photographs can be taken with so short a time of exposure that the movement of organic parts, such as heart and lungs, does not bring about troublesome unsharpness of the X-ray image, it has of late become more and more usual to substitute the method of the indirect X-ray photography for the direct method.

With indirect X-ray photography also use is made of a fluorescent screen, but the photographic film is not laid on this screen. It is placed at some distance from the screen and the image which appears on the screen is photographed on a reduced scale with the aid of a lens. For this purpose use may be made of an ordinary camera commercially sold, provided that it is designed for a high light-efficiency. Consequently, in most cases use is made of midget picture cameras.

The advantages of the indirect method are sufficiently known and need not be discussed in this description. A drawback hitherto inherent in this method is that for photographs requiring an extremely short time of exposure there is not always sufficient luminosity available to obtain a properly lighted photograph. Of course, it is possible always to operate with full lens opening but satisfactory results can in general only be obtained by utilizing comparatively expensive lens systems.

The invention has for its purpose to obviate this drawback and to shorten the required time of exposure and to reduce the cost of the apparatus for a certain light efficiency.

According to the invention, for focussing the fluorescent image on to the photo-sensitive layer use is made of a concave mirror. The manufacture of such a mirror is much simpler and hence considerably less expensive than that of a lens having the same ratio of aperture with the same size of the image. The reflecting surface may be applied, for example, to a concave lens of low refractive power and such a lens is not expensive.

When the optical system used is a spherical mirror surface, the apparatus according to the invention may be improved by providing a spherically shaped supporting surface for the film at the image point which surface is concentrically positioned relative to the mirror. With such an arrangement, the film travel device is so constructed that the film bears on this spherical supporting surface under some tension. The film material is slightly elastic and easily conforms to the spherical supporting surface so as to engage it throughout. For the same reason it is advisable that the fluorescent screen on which the X-ray image appears should also have a spherical shape whose centre of curvature coincides with that of the mirror. These measures result in an increase of the definition of the image.

Optical errors, such as spherical aberration, may be corrected by placing a correcting element in the path of the light rays, which element consists of a plastic transparent body having a surface suitable for correction. The use of such a correcting element for mirror telescopes is known per se. It has also lately been suggested in the copending application of A. Bouwers, Serial No. 472,918 filed January 19, 1943, to utilize as a corrective element a lens or a lens system having spherical surfaces and arranged in or near the centre of curvature of the mirror, whereby such corection is achieved in a simpler manner.

The invention will be explained more fully by reference to the accompanying drawing showing diagrammatically, by way of example, one form of construction of an apparatus according to the invention.

A shadow image of a body 3 of which an X-ray photograph is to be taken is thrown upon a fluorescent screen 2 with the aid of an X-ray tube 1. Part of the light radiated by the screen 2 is intercepted by a hollow spherical mirror 4 which is adjustably positioned within cap 9 by supporting member 12 and focussed by mirror 4 on to a roll film 5 arranged near the focus of the mirror. This film is located in a plane sleeve 6 which at the point where the image of the organic part to be photographed is produced has an aperture of a size normal for midget pictures, for example 32 mms. wide and 24 mms. high. Laterally from the intercepted light flux are arranged the boxes 7 and 8 which contain the rolled-up ends of the film. It will be understood that the plane sleeve 6 forms only a partial barrier between the screen 2 and the mirror 4, i. e. is in the form of a relatively narrow band, whereby only a small amount of the incident light is obstructed.

By means of a usual travel device an unexposed picture surface of the film may after each photograph be brought in front of the opening and the lighted portion rolled-up further until the whole film is exposed.

The camera may be provided with a shutter so that it is not necessary for the room where the photographs are taken to be darkened.

The day-light coming from the right is intercepted by a cap 9 which is preferably given a dead black inner surface in order to avoid troublesome light reflections. This cap extends on the left of the film in the form of a part 10 in order to avoid interfering light to the highest possible measure.

Part 10 contains a correcting element 11 in the form of a slightly refractive lens system which compensates the spherical aberration of the spherical mirror 4. It is located approximately in the centre of curvature of the mirror 4.

To improve the definition of the image, the supporting surface of the film at the point of the image has a spherical shape and is concentrically located relatively to the mirror 4, the fluorescent screen 2 being part of a spherical surface having its centre in the centre of curvature of the objective mirror 4. Owing to the two parts of the film sleeve occupying slanting positions, the film, which is subjected to a slight tension, engages the whole spherical part of the supporting surface so that the image is projected on a spherical surface.

When the apparatus is so constructed that images having a surface of about 5 cm.$^2$ are produced, numerous details can be observed in them with the unaided eye, or, if necessary, with the aid of a magnifying glass and an enlargement of the image will only now and then be required, when a more exact study of the photograph must be made.

In contrast, with smaller images, for example of 12 mm. x 16 mm. such as are produced by a midget picture camera, good observation always requires that the image be enlarged either photographically or by projection on a screen. By means of the invention which permits the obtainment of a definite light intensity at a considerably lower cost than with the use of a lens as an objective it is no longer necessary to limit oneself to such small picture sizes for indirect X-ray photography.

The arrangement of the invention is also applicable for producing small images in which case relatively inexpensive components may be used. For example, the interlayer of the mirror as well as for the correcting element may be made of normal spectacle glasses, with the aid of which an extremely cheap camera is obtained which yet may have a very favourable ratio of aperture, for example 1:0.9, with a resolving power of about 20 microns. With a 5-fold linear enlargement such a picture can already clearly be observed and still has a highly reasonable sharpness.

What I claim is:

1. Apparatus for indirect X-ray photography comprising a fluorescent screen having spherical shape, a concave mirror having a spherical reflecting surface adapted to form an image of the fluorescent screen, said fluorescent screen and said mirror being so arranged relative to each other that the center of curvature of the screen coincides with the center of curvature of the mirror, and means to support a photographic film member between said screen and said mirror and within the image-forming region of said mirror.

2. Apparatus for indirect X-ray photography comprising a fluorescent screen having spherical shape, a concave mirror having a spherical reflecting surface adapted to form an image of the fluorescent screen, said fluorescent screen and said mirror being so arranged relative to each other that the center of curvature of the screen coincides with the center of curvature of the mirror, means including a spherical supporting surface to support a photographic film member between said screen and said mirror and within the image-forming region of said mirror, and means to place the film in tension and to stretch the same into contact with said spherical supporting surface.

3. Apparatus for indirect X-ray photography comprising a fluorescent screen having spherical shape, a concave mirror having a spherical reflecting surface adapted to form an image of the fluorescent screen, said fluorescent screen and said mirror being so arranged relative to each other that the center of curvature of the screen coincides with the center of curvature of the mirror, means to support a photographic film member between said screen and said mirror and within the image-forming region of said mirror, and a correcting element for spherical aberration interposed between said screen and said mirror.

4. Apparatus as claimed in claim 3 wherein the correcting element consists of a plastic transparent material.

5. Apparatus as claimed in claim 3 wherein the correcting element consists of a lens system having spherical refracting surfaces.

ALBERT BOUWERS.

REFERENCES CITED

The following references are of record in the file of this patent:

UNITED STATES PATENTS

| Number | Name | Date |
|---|---|---|
| 1,431,271 | Van Allen | Oct. 10, 1922 |
| 1,624,443 | St. John | Apr. 12, 1927 |
| 1,646,065 | Pohlmann | Oct. 18, 1927 |
| 2,273,801 | Landis | Feb. 17, 1942 |
| 1,967,214 | Acht | July 24, 1934 |
| 1,967,215 | Acht | July 24, 1934 |
| 2,248,976 | Files | July 15, 1941 |
| 1,910,115 | Luboshez | May 23, 1933 |

FOREIGN PATENTS

| Number | Country | Date |
|---|---|---|
| 416,398 | British | Sept. 13, 1934 |